United States Patent [19]

Chamussy et al.

[11] Patent Number: 5,895,846

[45] Date of Patent: *Apr. 20, 1999

[54] METHOD OF PROCESSING SIGNALS IN A SYSTEM FOR MONITORING THE TIRES OF A VEHICLE DURING TRAVEL

[75] Inventors: Jean-François Chamussy, Blois; Jean-Pierre Francois, Romagnat; André Meunier, Lempdes, all of France

[73] Assignee: Compagnie Generale des Etablissements Michelin-Michelin & Cie, Clermont-Ferrand, France

[*] Notice: This patent issued on a continued prosecution application filed under 37 CFR 1.53(d), and is subject to the twenty year patent term provisions of 35 U.S.C. 154(a)(2).

[21] Appl. No.: 08/787,851

[22] Filed: Jan. 23, 1997

[30] Foreign Application Priority Data

Jan. 26, 1996 [FR] France ................... 96 01115
Mar. 6, 1996 [FR] France ................... 96 03005

[51] Int. Cl.⁶ .................................................. B60C 23/02
[52] U.S. Cl. ................................................... 73/146.2
[58] Field of Search ........................ 73/146, 146.2, 73/146.5, 146.8; 340/441, 442, 443, 444, 445, 449, 557; 364/424.03, 424.04, 558, 565, 571.07; 152/415, 416, 417

[56] References Cited

U.S. PATENT DOCUMENTS

| | | | |
|---|---|---|---|
| 4,532,493 | 7/1985 | Sibeud | 73/146.5 |
| 4,574,267 | 3/1986 | Jones | 73/146.2 |
| 4,893,110 | 1/1990 | Hebert et al. | 340/442 |
| 4,966,034 | 10/1990 | Bock et al. | 73/146.5 |
| 5,274,355 | 12/1993 | Galan | 340/445 |
| 5,525,960 | 6/1996 | McCall et al. | 340/443 |
| 5,540,092 | 7/1996 | Handfield et al. | 73/146 |
| 5,540,268 | 7/1996 | Mittal | 152/415 |
| 5,569,848 | 10/1996 | Sharp | 73/146.2 |

FOREIGN PATENT DOCUMENTS 2680137  2/1993  France.

*Primary Examiner*—William Oen
*Attorney, Agent, or Firm*—Baker & Botts, LLP

[57] ABSTRACT

A method of processing signals in a system for monitoring tires of a vehicle during travel, the system providing for each tire at least one measurement which is characteristic of the condition of inflation of the tire, in which:

based on measurements carried out substantially at the same time, the measurement characteristic of one tire is compared with the same measurement of at least one other tire, the result of this comparison is periodically recorded so as to obtain a series of values, an alarm is given off when the variation in time of this series of values satisfies a predetermined relationship.

23 Claims, 4 Drawing Sheets

METHOD OF PROCESSING SIGNALS IN A SYSTEM FOR MONITORING THE TIRES OF A VEHICLE DURING TRAVEL

BACKGROUND OF THE INVENTION

The present invention relates to systems for monitoring tires. More particularly, it concerns the processing of measurements carried out on tires in order to give one or more alarms.

Numerous arrangements, such as that of U.S. Pat. No. 4,703,650, have been proposed in order to transmit inflation pressure measurements of each tire continuously to a central unit, accompanied possibly by measurements of the temperature of the air within the tires.

However, a knowledge of the inflation pressures is not sufficient to provide the driver with reliable, useful information. The continuous consulting of these indications runs the risk of being more tedious than actually useful. As a matter of fact, the pressure and/or temperature measurements of tires vary enormously upon travel due to the heating of the tires as a result of hysteresis losses, the influence of the heat given off by the brakes, and transfers of load which cause slight variations in the volume of the tires.

For this reason, U.S. Pat. No. 4,893,110 has proposed a method of processing measurements based on comparisons between two or more tires, directed at the ability to give off an alarm in case of a leak of a tire without adopting alarm thresholds which are too far from the precision attained by the measurement devices.

This processing, despite its interest, has not completely solved the problem. In fact, the improvement in the precision of the detection in case of leak of a tire requires that the initial pressures of the tires be strictly identical. Actually, this is by no means the case and it is entirely customary and usual to observe differences in inflation pressure when cold on the order of 10% or even 15%. This is furthermore the range accepted, for instance, by the European Technical Rim and Tire Organization (ETRTO) for heavy vehicles. These differences are due in particular to the precision of about 5% of the inflation gauges, the lack of precision upon inflation of about 3%, the consequences of sunshine on one of the tires, etc. The method described in the aforementioned application can therefore not have a better precision of detection than the customary initial differences, if one does not desire to bring about numerous false alarms. Therefore, a leak in one of the tires can be detected only after a very substantial decrease in the inflation pressure of the tire and one which makes immediate repair necessary.

SUMMARY OF THE INVENTION

The object of the invention is a method of processing the measurement signals of a tire-monitoring system which detects any leak in one of the tires during travel much earlier.

Another object of the invention is to provide reliable and differentiated information as a function of the change in the condition of inflation of the tires due to a leak.

In accordance with the invention, the method for the processing of signals in a system for monitoring tires of a vehicle during travel, said system delivering for each tire at least one measurement of the inflation pressure of said tire, is such that:

based on measurements carried out substantially at the same time, the inflation pressure of one tire is compared with the inflation pressure of at least one other tire, the result of this comparison is periodically recorded in order to obtain a series of values, an alarm is given off when the variation in the time of this series of values satisfies a predetermined relationship.

This method employs as criterion for the giving-off of an alarm not a difference between the inflation pressures of at least two tires but the variation in time of such difference. This has the advantage of eliminating all the false alarms resulting from initial differences in inflation of the tires and thus of considerably improving the actual precision of the detection of a leak.

This method is a remarkable supplement to the conventional individual monitoring of the tires relative to at least one given critical threshold the purpose of which is to verify at any moment that the inflation pressures are within a safe range (this requires the use of several thresholds), or beyond a critical safety threshold.

The comparison carried out may consist in calculating a difference between the inflation pressures of the two tires of the same axle of the vehicle. This comparison may also involve two axles or more, namely, for example:

add the inflation pressure of a tire of a first axle and the inflation pressure of a tire of a second axle;

add the inflation pressure of the second tire of the first axle and the inflation pressure of the second tire of the second axle, and establish the difference between these two sums.

An alarm is advantageously given when the variation in time of the series of values exceeds, in absolute value, a given threshold S. This threshold may be between 3% and 7% and preferably between 3% and 5% of the nominal value of the inflation pressure.

It is thus noted that, if one observes a variation in difference of more than, for instance, 5% of its nominal value, one can detect a probable leak of one of the tires of the vehicle. This detection can thus be made most frequently before the actual inflation pressure has even dropped below the nominal cold pressure.

DESCRIPTION OF THE DRAWINGS

The invention is explained by the following figures and description, given solely by way of example.

DESCRIPTION OF PREFERRED EMBODIMENTS

Figure 3:
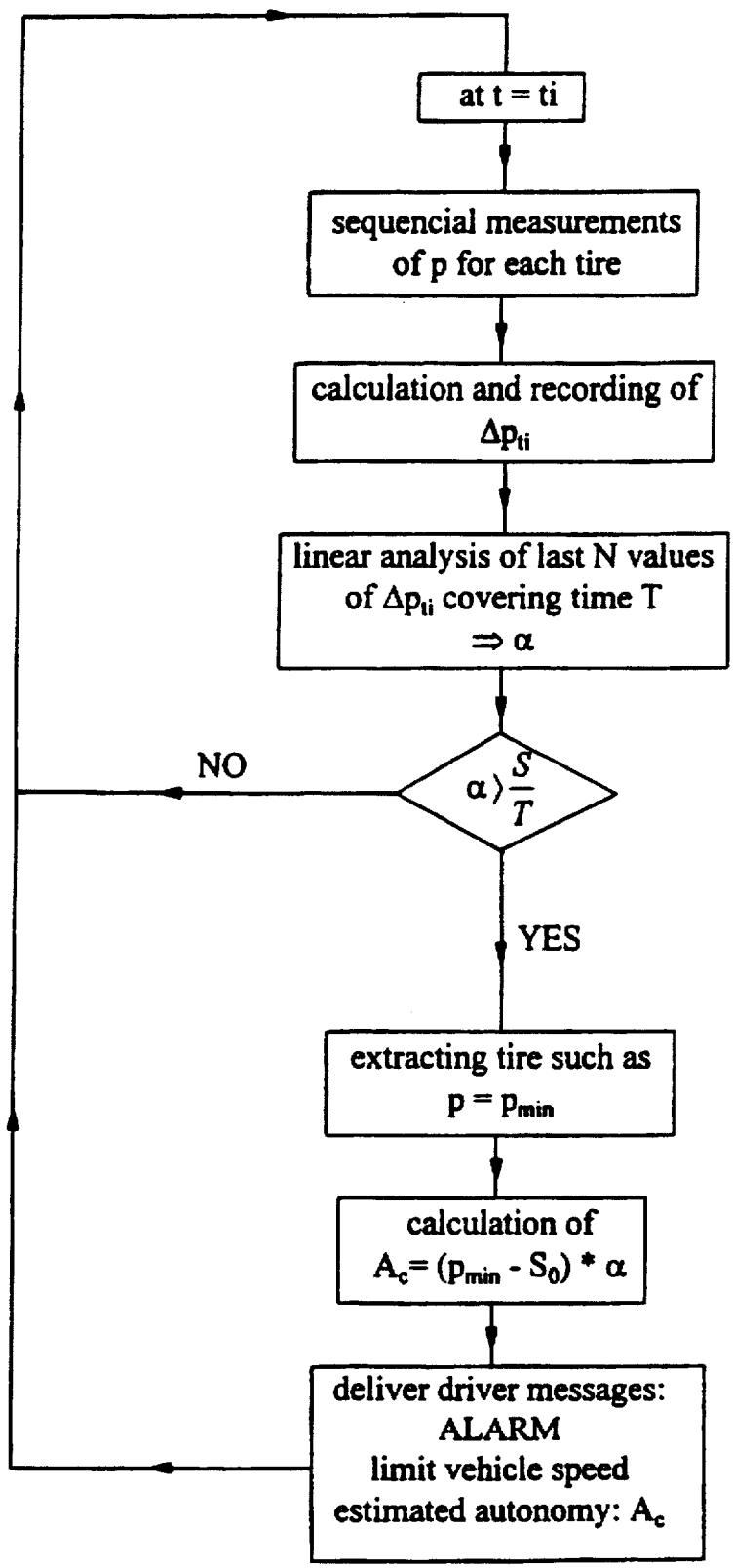
FIG. 3 is a flow chart illustrating a first embodiment of the method according to the invention.

In accordance with one embodiment of the invention illustrated in the flow chart of FIG. 3, said series of values is formed by periodically recording the results of the comparison $\Delta p_n$ and retaining the last N values covering a total time T, determining a linear regression of said N recordings, calculating the slope of the linear regression line and triggering an alarm if the slope α is greater, in absolute value, than the ratio between the threshold S and the total time T. The number of recordings of the measurement series can be limited for example to 10.

Advantageously, several series of values of different total times T are constituted at the same time in order to cover all the observed ranges of the kinetics of deflation of tires from a minute to several days and more. For example, $T_1=1$ min, $T_2=10$ min, $T_3=1$ hour, $T_4=12$ hours and $T_5=3$ days, etc. One can thus detect very different rates of leakage, some faster and some slower.

An example of application of the method of the invention is described in connection with FIGS. 1 and 2.

Figure 1:
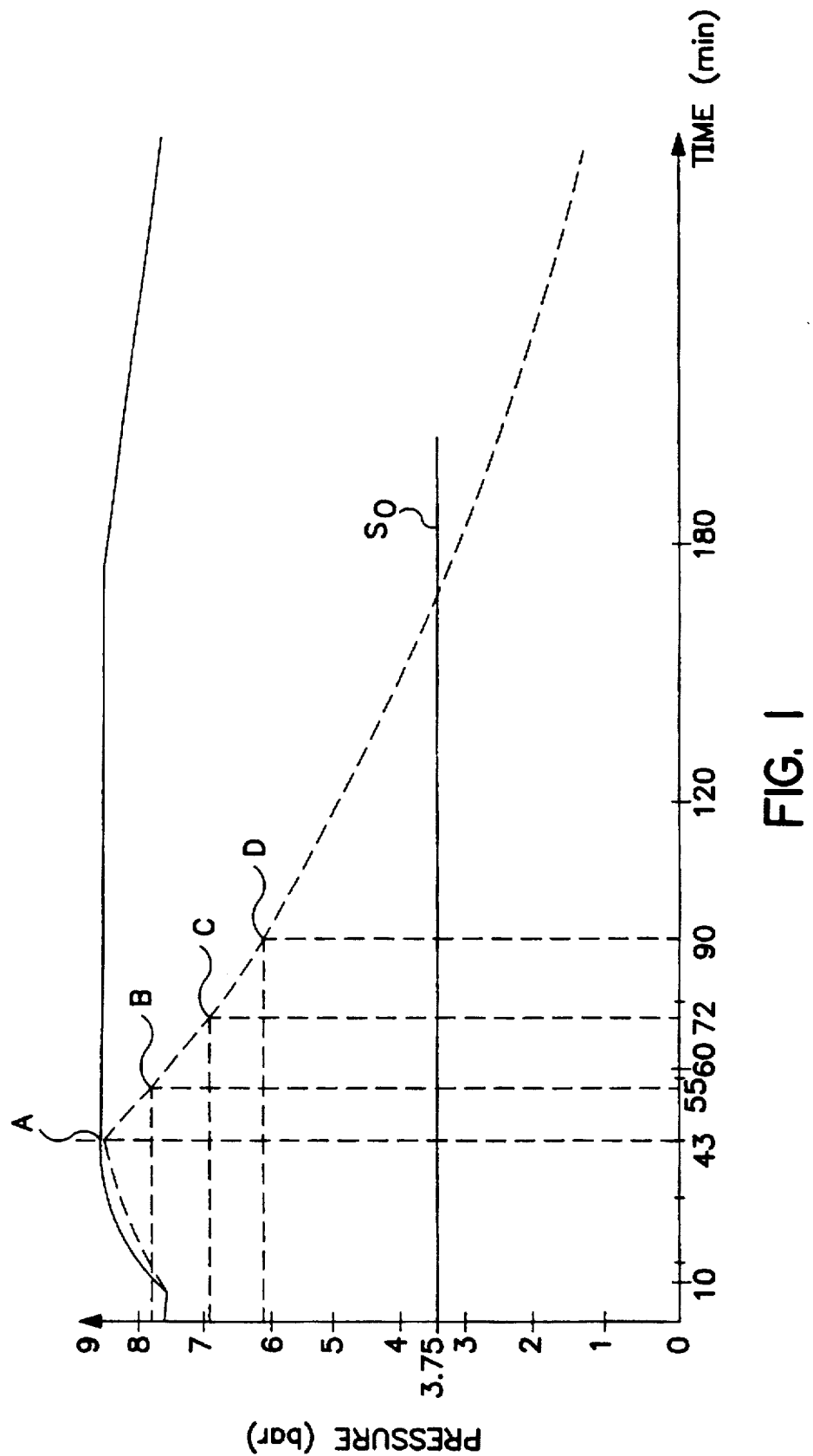
FIG. 1 presents the relationship of the air pressure with time of two tires of the same axle of a truck vehicle.
Figure 2:
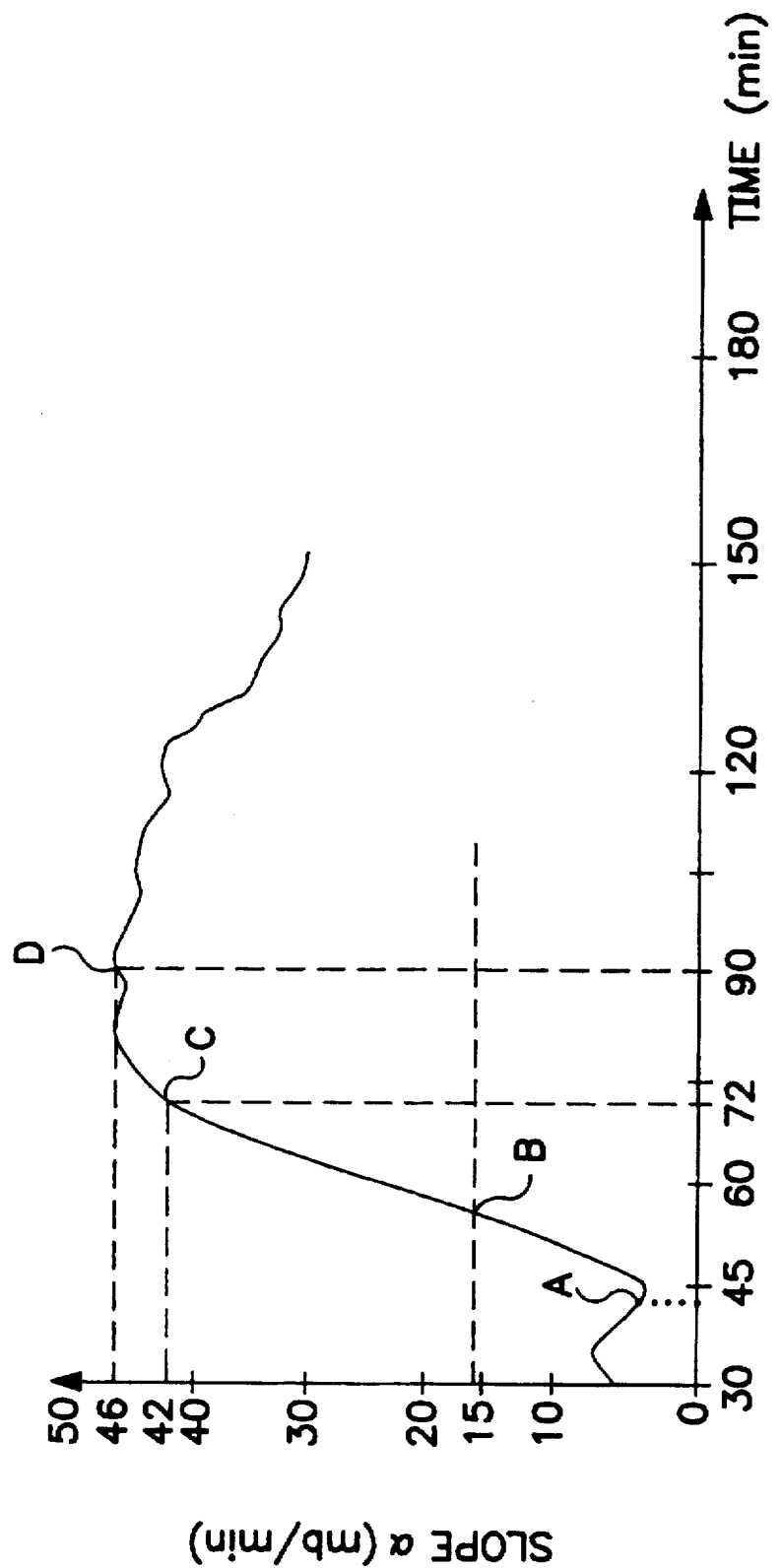
FIG. 2 shows the corresponding variation of the slope α calculated according to the method of the invention.

FIG. 1 shows the relationships of the air pressure with time of two tires of the same axle of a truck tire.

Initially the two tires have an air pressure of 7.6 bars, very near the nominal air pressure of 7.5 bars.

After the beginning of travel, the air pressures of the tires usually increase to about 8.3 bars due to their hysteresis losses. Then, after nearly 43 min. rolling, a leak occurs in one of the tires (point A), the leak being initially 50 mbar/min.

Considering a total time T=30 min. and a threshold of 0.5 bar, the system measures at intervals of 3 min. the values of the air pressures of the two tires, calculates the difference between these two values, records it, determines a linear regression of the last 10 values recorded and calculates the slope $\alpha$ of this linear regression line. FIG. 2 represents the variation of this slope $\alpha$ with time.

The first value of $\alpha$ is calculated when the system has recorded 10 values. The initial slopes calculated are about 5 mb/min. 6 min after the occurrence of the leak, an increase of the slope calculated is noticeable and 12 min later, the value of the threshold of 500/30=16.6 mb/min is crossed and an alarm is triggered by the system to the driver.

At the time B, it is interesting to observe that the value of the air pressure is 7.8 bars, a value still over the nominal air pressure.

It is also desirable advantageously to retain in non-volatile memory all the series of values of the regressions upon the stopping of the vehicle. This has the advantage of making it possible to immediately effect the analyses of the series of values corresponding to the longer periods of time and thus considerably to improve the effectiveness of the detection of the slowest leakage rates.

It is also possible not to take stop times of the vehicle into account in the regressions. This makes it possible to benefit from the acceleration effect due to the leakage during the total stop time. This accelerates the detection of a leak.

This embodiment makes it possible considerably to improve the relevance of the information transmitted to the driver. In fact, after an alarm has been triggered (FIG. 3):

one determines, among the tires concerned in said comparison, the tire the inflation pressure of which is minimum, based on the value of the slope a, one calculates an estimate of the time necessary in order for the inflation pressure of said tire to drop below a critical threshold $S_0$, this estimate is transmitted to the driver of the vehicle.

This transmitted estimate gives the driver information, constantly updated upon each new recording of the result of a comparison, of the driving distance which remains for him before having either to limit his speed of travel or stop and repair the leak, depending upon the critical threshold selected.

Referring again to FIG. 1, 72 min after the beginning of the travel and 29 min after the happening of the leak, the tire air pressure is at 7 bars. At this time C, the system gives the value of the slope $\alpha$=42 mbar/min (FIG. 2) and calculates an estimate $A_c$ of the time necessary in order for the tire air pressure to drop below a critical threshold $S_0$ chosen as $P_{nom}/2=3.75$ bar.

$A_c$ is equal to the ratio of the actual tire pressure minus the threshold $S_0$ by the slope $\alpha$.

So, $A_c=(7.0-3.75)\times 1000/42=77$ min.

A few minutes later, 90 min after the beginning of the travel, at point D, the actual air pressure has dropped to 6.3 bar and the slope $\alpha$=46 mb/min. The estimate is now $A_c$=55 min.

As previously, it is desirable to retain in nonvolatile memory all of the series of values of the regressions upon the stopping of the vehicle. However, contrary to the case of the detection of leaks, in order to obtain a good precision of the calculation of the remaining travel distance, it is preferable to take the standstill periods of the vehicle into account.

Experience has, however, shown that such information as to the remaining travel distance is not as reliable as would be desirable. The reason for this lack of reliability is that, when a tire is perforated by an object such as a screw or a nut, the leak which results therefrom commences very slowly, generally at a rate less than about 10 mbar/hr. However, if this object is expelled from the tire, then the rate of leakage suddenly becomes much greater, reaching values of at least 10 mbar/sec. Under these conditions, the tire concerned becomes flat very rapidly.

Accordingly, in order to make a reliable estimate of the remaining distance of travel available to a driver after the giving of an alarm, it is desirable to immediately ask the driver to limit his speed in such a way that the expelling of the object responsible for the leak becomes very improbable or less risky. A maximum speed of about 100 km/hr already substantially reduces the risk of ejection.

Figure 4:
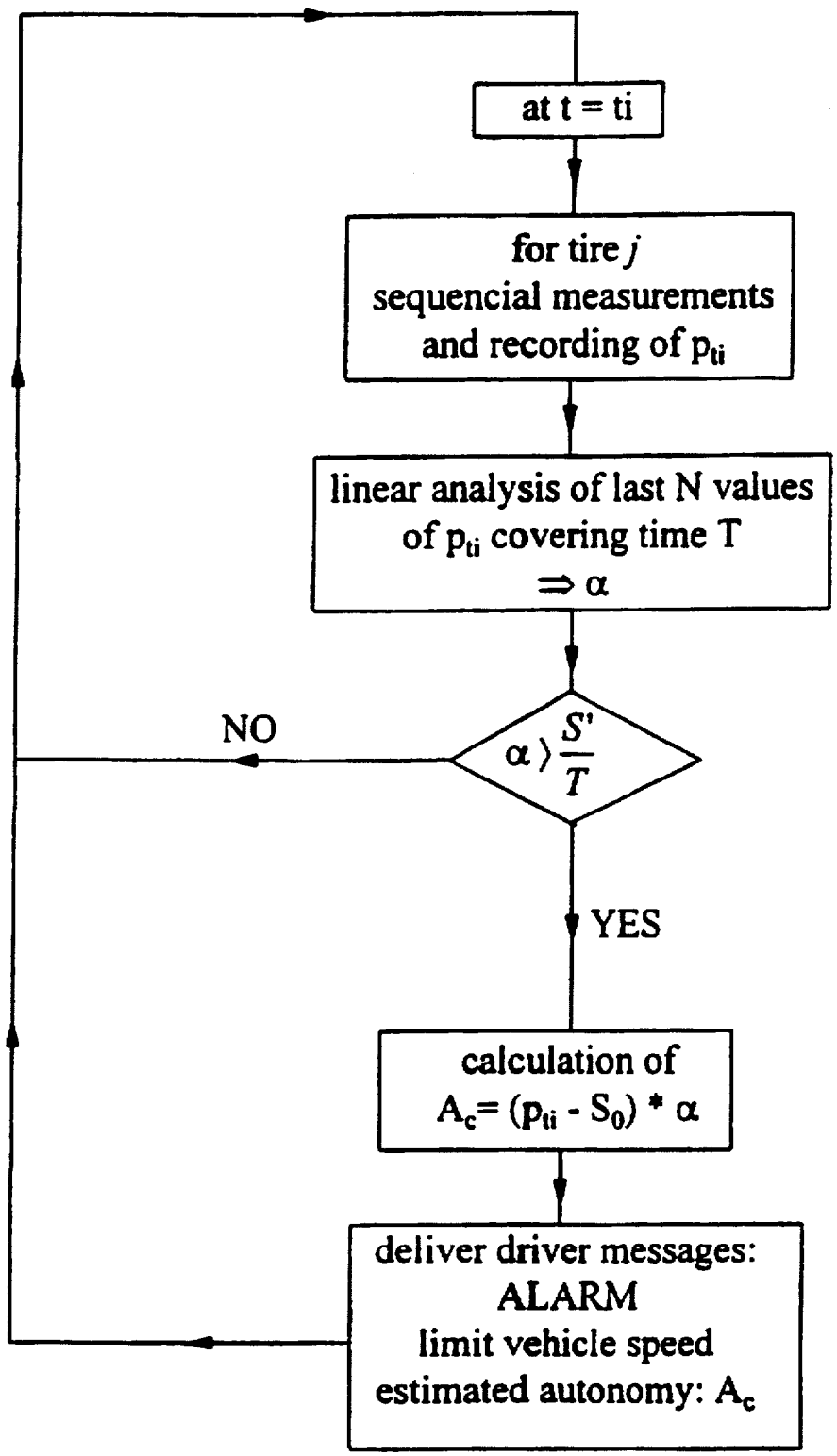
FIG. 4 is a flow chart illustrating a second embodiment.

The method of the invention uses the direct measurement of the inflation pressure of the tires. As presented in the flow chart of FIG. 4, after having made sequential measurements and recorded the inflation pressure $p_n$ of the tires of a vehicle at time t=ti, and after a linear analysis of the last N values of $p_n$ covering time T and having calculated a slope $\alpha$ and after having compared $\alpha$ and a ratio S/T, S being a threshold, if an alarm is triggered, it is also possible to calculate an estimate of the time necessary for the inflation pressure of the tire to drop below a given critical threshold $S_0$ and transmit it to the driver as before with advice to limit the vehicle speed.

However, it is also possible to use the measurements of the inflation pressure as well as an estimate of the temperature of the air within the tire; in this case, the condition of inflation of the tire can be characterized by the ratio between the absolute inflation pressure and the absolute temperature. This second solution has the advantage of improving the precision of the measurements by reducing the effect of disturbing phenomena such as thermal imbalance between the wheels on one axle.

Theoretically, this processing of the measurements makes it possible to follow up the change in the amount of air present in the tire and therefore to do away with the necessity of analyzing the differences in the pressure measurement between the homologous tires on one or more axles. In practice, the measurement of the air within a tire can only be an estimate, in view of all the disturbances due to the heating upon braking or travel and, more generally, the environment around the tires, which greatly limits the practical interest of such a method of operation without, however, preventing it.

For the carrying out of the method of the invention, use may be made of a monitoring device such as disclosed in U.S. Pat. No. 4,703,650, having an electronic unit for the measurement of pressure per wheel which, by inductive coupling, transmits the measurement signals to a central unit arranged in the vehicle and connected, in its turn, to a display device close to the driver. One can also use a device which transmits the same information by radio to a similar central unit.

We claim:

1. A method of processing signals in a system for monitoring tires of a vehicle during travel, said system having, for each tire, at least one measurement of the inflation pressure of said tire, comprising:

measuring, at substantially the same time, the inflation pressure of a first tire and of a second tire;

calculating the difference in the inflation pressures of the first and second tires;

recording periodically the calculated pressure difference and retaining the last N values covering a total time T in order to obtain a series of values;

effectuating a trend analysis of said series of values; and giving off an alarm when said trend analysis satisfies a predetermined relationship.

2. A method according to claim 1, in which said trend analysis comprises the steps of:

establishing a linear regression of said N recordings; and calculating the slope $\alpha$ of the linear regression line.

3. A method according to claim 2, in which:

said alarm is triggered if the slope $\alpha$ is greater, in absolute value, than a given value.

4. A method according to claim 3, in which:

said alarm is triggered if the slope $\alpha$ is greater, in absolute value, than the ratio between a threshold S and the total time T.

5. A method according to claim 4, in which said threshold S is between 3% and 7% of the nominal value of the inflation pressure.

6. A method according to claim 4, in which said threshold S is between 3% and 5% of the nominal value of the inflation pressure.

7. A method according to claim 1, in which said first and second tires are on the same axle of the vehicle.

8. A method according to claim 1, in which several series of values of different total times T are constituted in order to cover all of the customary ranges of the deflation kinetics of the tires of vehicles.

9. A method according to claim 8, in which the range of times covered is on the order of a minute to several days.

10. A method according to claim 1, in which the series of recorded values are stored in a non-volatile memory.

11. A method according to claim 10, in which the stop time of the vehicle is not taken into account in the series of values recorded.

12. A method according to claim 1, comprising, after an alarm has been given off:

determining, out of said first and second tires, the tire the inflation pressure of which is minimum;

based on the result of the trend analysis, calculating an estimate of the time necessary in order for the inflation pressure of said tire to drop below a critical threshold $S_0$; and transmitting this estimate to the driver of the vehicle.

13. A method according to claim 3, comprising, after an alarm has been given off:

determining, out of said first and second tires, the tire the inflation pressure of which is minimum;

based on the value of the slope $\alpha$, calculating an estimate of the time necessary in order for the inflation pressure of said tire to drop below a critical threshold $S_0$; and transmitting this estimate to the driver of the vehicle.

14. A method according to claim 1, in which, said system having also, for each tire, the measurement of an estimate of the temperature of the air within the tire, the condition of inflation of the tire is characterized by the ratio between the absolute inflation pressure and the absolute temperature.

15. A method according to claim 12, in which said estimate is calculated from upon each new recording of the calculated pressure difference value.

16. A method according to claim 15, in which the driver is asked to limit his speed in order to limit the risks of ejection from the tire of an object responsible for the leak.

17. A method of processing signals in a system for the monitoring of tires of a vehicle during travel, said system delivering for each tire at least one measurement of the inflation pressure of said tire, comprising:

measuring and periodically recording the inflation pressure for at least one tire;

retaining the last N values covering a total time T in order to obtain a series of values;

effectuating a trend analysis of said series of values in order to give off an alarm if the trend observed is greater than a given value;

after an alarm has been triggered, calculating an estimate, based on, the extent to which the trend is greater than the given value of the time that it will take in order for the measured inflation pressure of the tire to drop below a given critical threshold $S_0$;

transmitting this estimate to the driver of the vehicle.

18. A method of processing signals in a system for monitoring tires of a vehicle during travel, said system having, for each tire, at least one measurement of the inflation pressure of said tire, in which:

based on measurements carried out substantially at the same time, the inflation pressure of one tire is compared with the inflation pressure of at least one other tire;

this comparison of inflation pressures is periodically recorded in order to obtain a series of values;

an alarm is given off when a variation in time of said series of values exceeds, in absolute value, a given threshold S;

said series of values being established by retaining the last N recorded values covering a total time T;

establishing a linear regression of said N recorded values; and calculating the slope $\alpha$ of the linear regression line and triggering the alarm if the slope $\alpha$ is greater, in absolute value, than the ratio between the threshold S and the total time T.

19. A method according to claim 18, in which several series of values of different total times T is constituted in order to cover all of the customary ranges of the deflation kinetics of the tires of vehicles.

20. A method according to claim 19, in which the range of times covered is on the order of a minute to several days.

21. A method according to claim 18, in which, after an alarm has been given:

the tire the inflation pressure of which is minimum from among the tires concerned in said comparison is determined;

based on the value of the slope $\alpha$, an estimate is made of the time necessary in order for the inflation pressure of said tire to drop below a critical threshold $S_0$;

this estimate is transmitted to the driver of the vehicle.

22. A method according to claim 21, in which said estimate is updated upon each new recording of a comparison result.

23. A method according to claim 21, in which the driver is asked to limit his speed in order to limit the risks of ejection from the tire of an object responsible for the leak.

* * * * *